US008070564B1

(12) United States Patent
Haislip, Jr.

(10) Patent No.: US 8,070,564 B1
(45) Date of Patent: Dec. 6, 2011

(54) APPARATUS AND METHOD FOR STUNNING POULTRY WITH MINIMUM DAMAGE TO THE POULTRY PRODUCTS

(75) Inventor: Ellis Clifton Haislip, Jr., Laurel Hill, NC (US)

(73) Assignee: Mattco Industrial Products, Denver, NC (US)

( * ) Notice: Subject to any disclaimer, the term of this patent is extended or adjusted under 35 U.S.C. 154(b) by 0 days.

(21) Appl. No.: 13/105,042

(22) Filed: May 11, 2011

Related U.S. Application Data

(60) Provisional application No. 61/333,972, filed on May 12, 2010.

(51) Int. Cl.
*A22B 3/06* (2006.01)
(52) U.S. Cl. ......................................................... 452/59
(58) Field of Classification Search ................ 452/52, 452/53, 57–59, 63, 67
See application file for complete search history.

(56) References Cited

U.S. PATENT DOCUMENTS

| 4,694,534 | A | * | 9/1987 | Simmons | 452/59 |
| 4,751,767 | A | * | 6/1988 | Walther | 452/53 |
| 5,487,699 | A | * | 1/1996 | Tyrrell et al. | 452/66 |
| 5,954,572 | A | * | 9/1999 | Kettlewell et al. | 452/58 |
| 5,954,573 | A | * | 9/1999 | Ohgaki et al. | 452/67 |
| 6,019,674 | A | * | 2/2000 | Austin | 452/59 |
| 6,135,872 | A | * | 10/2000 | Freeland et al. | 452/66 |
| 6,174,228 | B1 | * | 1/2001 | Grimsland et al. | 452/66 |
| 7,097,552 | B2 | * | 8/2006 | Ovesen et al. | 452/66 |
| 7,377,843 | B2 | * | 5/2008 | Koops | 452/58 |
| 7,438,637 | B2 | * | 10/2008 | Zachariassen et al. | 452/66 |
| 7,717,773 | B2 | * | 5/2010 | Woodford et al. | 452/66 |
| 7,846,012 | B2 | * | 12/2010 | Koops | 452/58 |

* cited by examiner

*Primary Examiner* — Richard Price, Jr.
(74) *Attorney, Agent, or Firm* — Trego, Hines & Ladenheim, PLLC

(57) ABSTRACT

The present invention relates to an apparatus for stunning and separating poultry during the stunning process. The apparatus includes a multi-zone trough having a plurality of basins and a separator adapted to separate shackled poultry hung from a conveyor system into a respective one of the plurality of basins. Each of the plurality of basins is separated by a divider. Once separated, the divider maintains the poultry in a separated condition during a stunning process.

18 Claims, 5 Drawing Sheets

APPARATUS AND METHOD FOR STUNNING POULTRY WITH MINIMUM DAMAGE TO THE POULTRY PRODUCTS

This application claims the benefit of Provisional Application No. 61/333,972 filed on May 12, 2010.

TECHNICAL FIELD AND BACKGROUND OF THE INVENTION

This invention is related to the poultry industry and, more particularly, to an apparatus for stunning and separating poultry during the stunning process.

In the U.S. and throughout the world, poultry consumption is very large. With the increasing popularity of wings and other parts, the poultry industry is now benefiting from the sale of poultry parts that, in the past, would have been thrown away. However, one of the problems the poultry industry faces is damage to poultry parts during processing, resulting in millions of dollars being unrealized.

In current poultry processing plants, chickens or other poultry are typically hung on a shackle of an inline conveyor system which delivers the chickens to a stun zone where stunners are used to render chickens unconscious. The inline conveyor system positions the chickens in a side by side, closely knit position that allows the chickens to come into contact with each other.

During the stunning process, the chickens move their wings toward their body. Because of the side by side arrangement of the inline conveyor systems, the wings often get caught on chickens residing directly next to the chicken being stunned. As a result, the wings and shoulders of the chickens are damaged.

Different voltages, different currents in the stunner, and increased distances from hanging shackle to hanging shackle on the conveyor systems have all been tried with little or no improvement in reducing the physical damage caused to the poultry during this phase of the processing.

Accordingly, there is a need for a poultry processing apparatus that allows the poultry to be processed while minimizing the amount of physical damage to the poultry.

BRIEF SUMMARY OF THE INVENTION

These and other shortcomings of the prior art are addressed by the present invention, which provides an apparatus for stunning and separating poultry with minimal damage to the poultry products.

According to one aspect of the present invention, an apparatus for stunning poultry includes a multi-zone trough having a plurality of basins and a separator adapted to separate shackled poultry hung from a conveyor system into a respective one of the plurality of basins. Each of the plurality of basins is separated by a divider. Once separated, the divider maintains the poultry in a separated condition during a stunning process.

According to another aspect of the present invention, a method of stunning poultry includes the steps of providing an apparatus having a multi-zone trough and a separator; and shackling poultry to shackles connected to a conveyor system; conveying the shackled poultry towards the multi-zone trough. The method further includes the steps of using the separator to separate the shackled poultry into a respective zones of the multi-zone trough; conveying the separated shackled poultry into basins of the multi-zone trough; and stunning the shackled poultry.

According to another aspect of the present invention, a method of stunning poultry includes the steps of providing an apparatus having a multi-zone trough and a separator; shackling poultry to shackles connected to a conveyor system; and conveying the shackled poultry towards the multi-zone trough. The method further includes the steps of using the separator to move every other shackled poultry outwardly such that the moved poultry is divided from unmoved poultry by a divider of the multi-zone trough; conveying the separated shackled poultry into basins of the multi-zone trough; and stunning the shackled poultry.

BRIEF DESCRIPTION OF THE DRAWINGS

The invention may be best understood by reference to the following description in conjunction with the accompanying drawing figures in which.

DESCRIPTION OF THE PREFERRED EMBODIMENT AND BEST MODE

Figure 1:
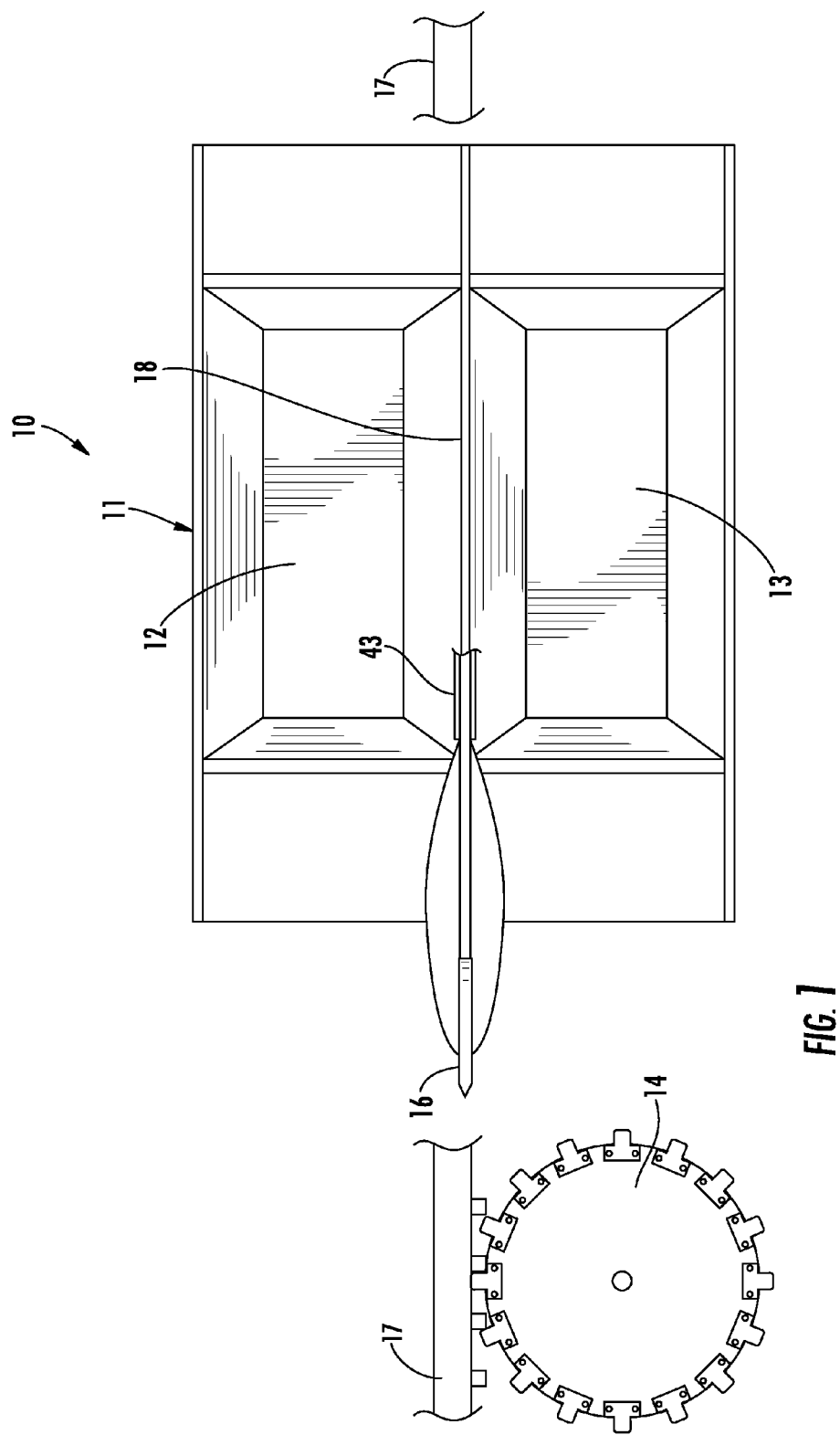
FIG. 1 is a plan view of an apparatus for processing poultry according to an embodiment of the invention.
Figure 2:
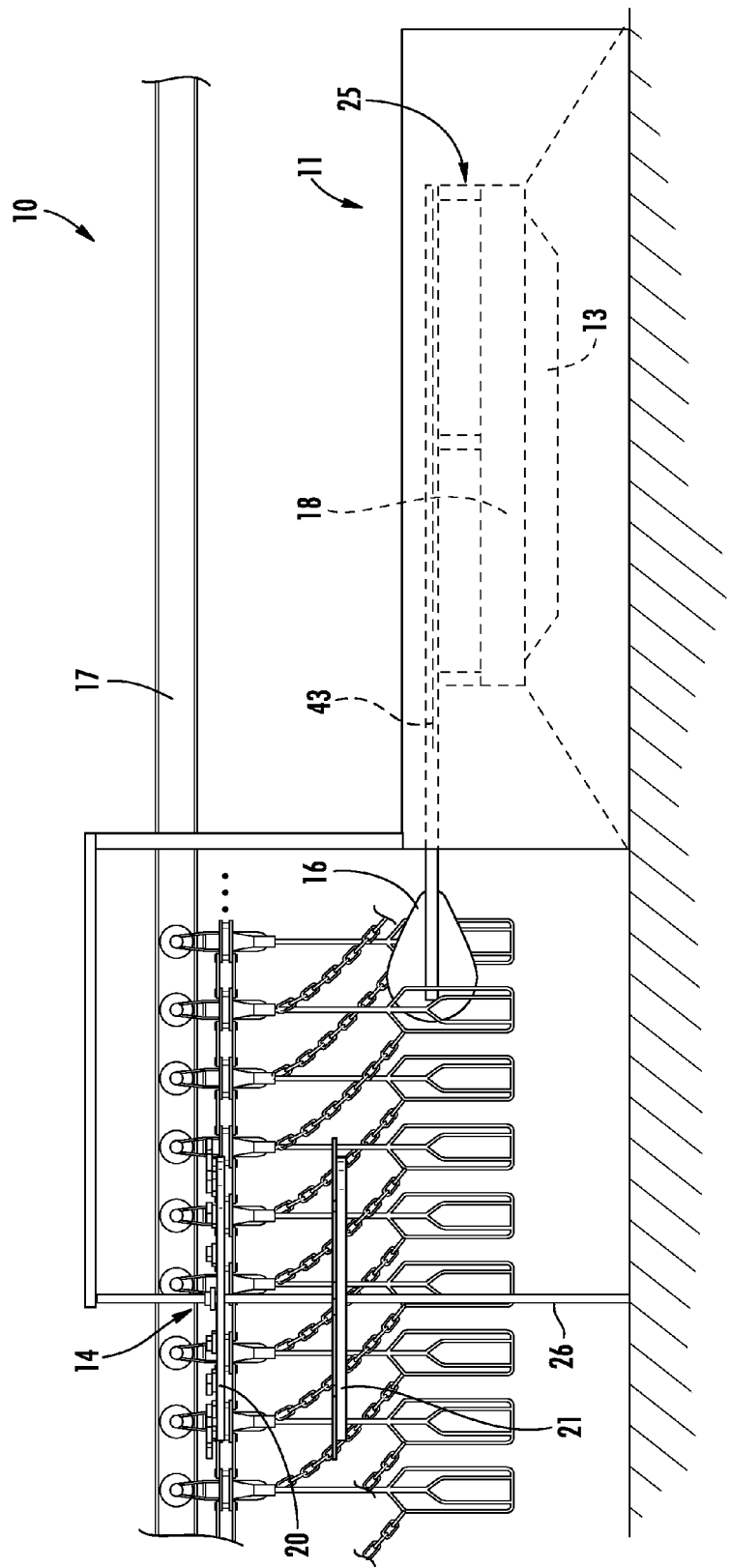
FIG. 2 shows a side elevation of the apparatus of FIG. 1.
Figure 3:
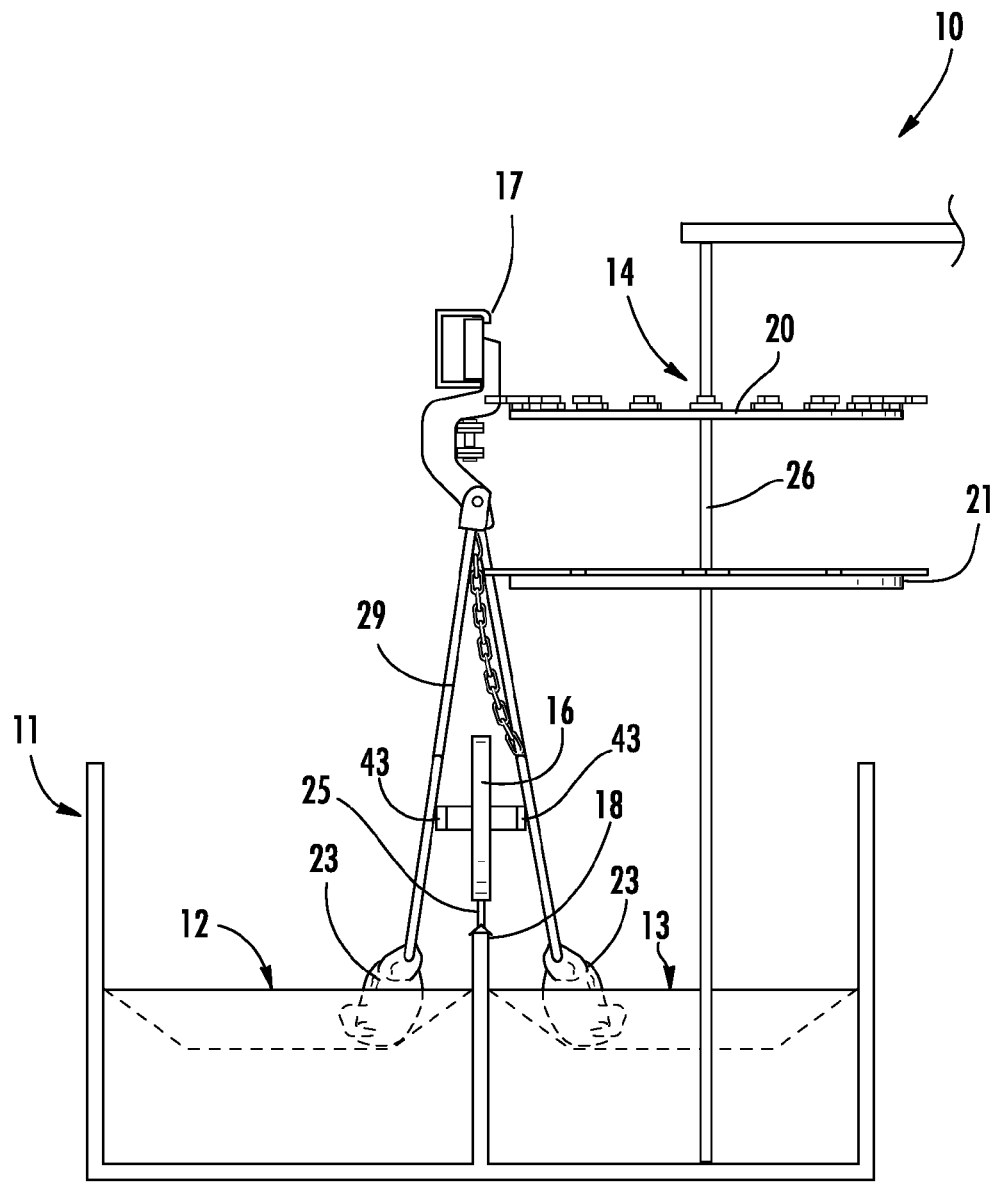
FIG. 3 shows a front elevation of the apparatus of FIG. 1.

Referring now specifically to the figures, an apparatus for processing poultry according to an embodiment of the invention is illustrated in FIGS. 1-3 and shown generally at reference numeral 10. The apparatus 10 includes a multi-zone trough 11 having basins 12 and 13 separated by divider 18, a separator 14, a diverter 16 positioned above the divider 18, and a conveyer system 17 formed by a plurality of interconnecting links. It should be appreciated that more than two basins may be used.

As shown in FIGS. 2 and 3, the trough 11 is positioned beneath the conveyor system 17 such that the conveyor system 17 is positioned directly above a center basin divider 18 of the trough 11. The basins 12 and 13 are adapted to receive and contain an electrolyte solution to impart an electrical current into the poultry being conveyed therethrough.

The separator 14 may be connected to the trough 11, as shown, or to any other suitable structure such that the separator 14 is positioned to engage the conveyer system 17 to allow the separator 14 to move every other shackled chicken or other poultry 23 to an opposing side of the diverter 16. The diverter 16 runs the length of the trough 11 and is positioned and supported above the divider 18 by a stand 25 positioned on a top of the divider 18. The diverter 16 diverts every other chicken 23 to a different one of the basins 12 and 13, as shown in FIG. 3. The diverter 16 is supported above the divider 18 by a stand positioned on a top of the divider 18. It should be appreciated that the diverter 16 may also run along opposing sides of the central basin divider 18.

Figure 4:
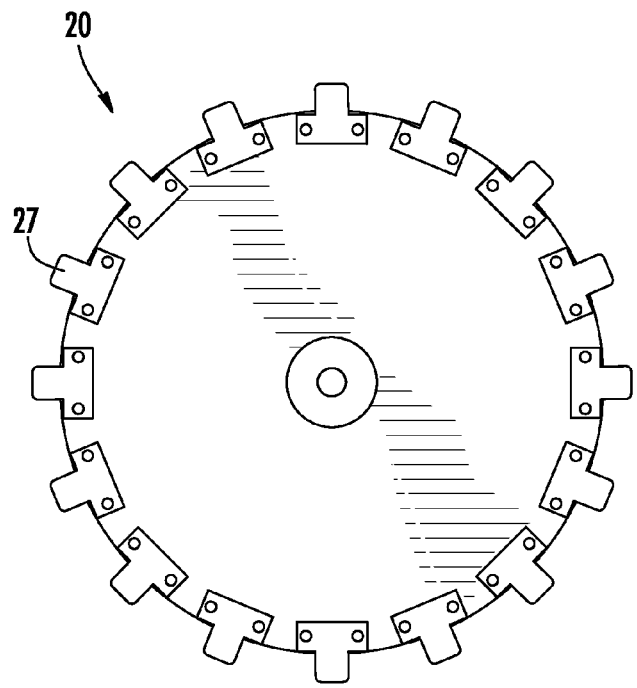
FIG. 4 shows a drive disc of a separator of the apparatus of FIG. 1.
Figure 5:
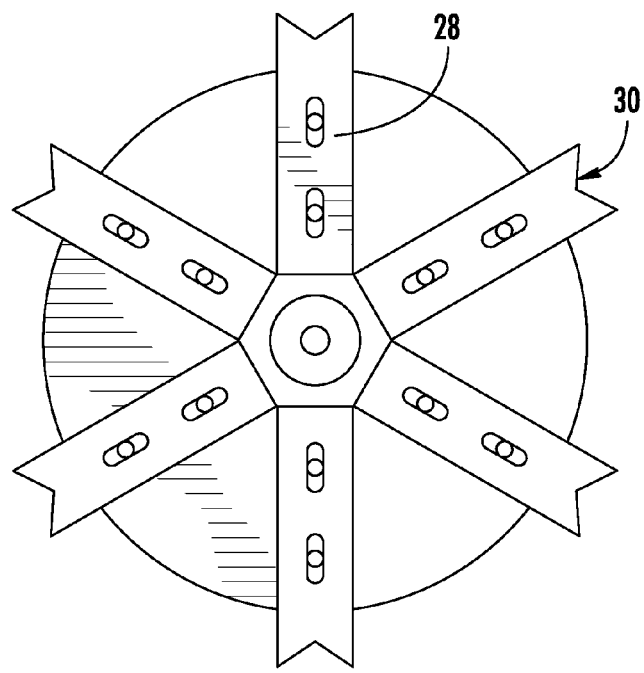
FIG. 5 shows a selector disc of the separator of the apparatus of FIG. 1.

The separator 14 includes two discs: drive disc 20 and selector disc 21 aligned by and mated to a central shaft 26. As shown in FIG. 4, disc 20 acts like a gear and includes a plurality of teeth 27 disposed around a circumference of the disc 20. The teeth 27 are sized to mate with individual links of the conveyor system 17 such that movement of the conveyor system 17 causes the disc 20 to rotate and thereby drive the separator 14. As illustrated in FIG. 5, disc 21 includes a plurality of spaced-apart arms 28 adapted to interact with shackles 29 connected to the conveyor system 17. The arms 28 are adjustably connected to the disc 21 and include a V-shaped groove 30 at an end to allow the arms 28 to receive and push a shackle 29 outwardly. The arms are spaced to allow the arms 28 to only receive every other one of the shackles 29, thereby allowing the disc 21 to move every other shackled chicken 23 to an opposing side of the diverter 16, FIG. 3. It should be appreciated that other suitable types of separators may be used. For example, an air or water gun using intermittent blasts, a magnet using intermittent pulses to push or pull shackles may be used to move the poultry, or a pigtail or other mechanical means may be used.

Figure 6:
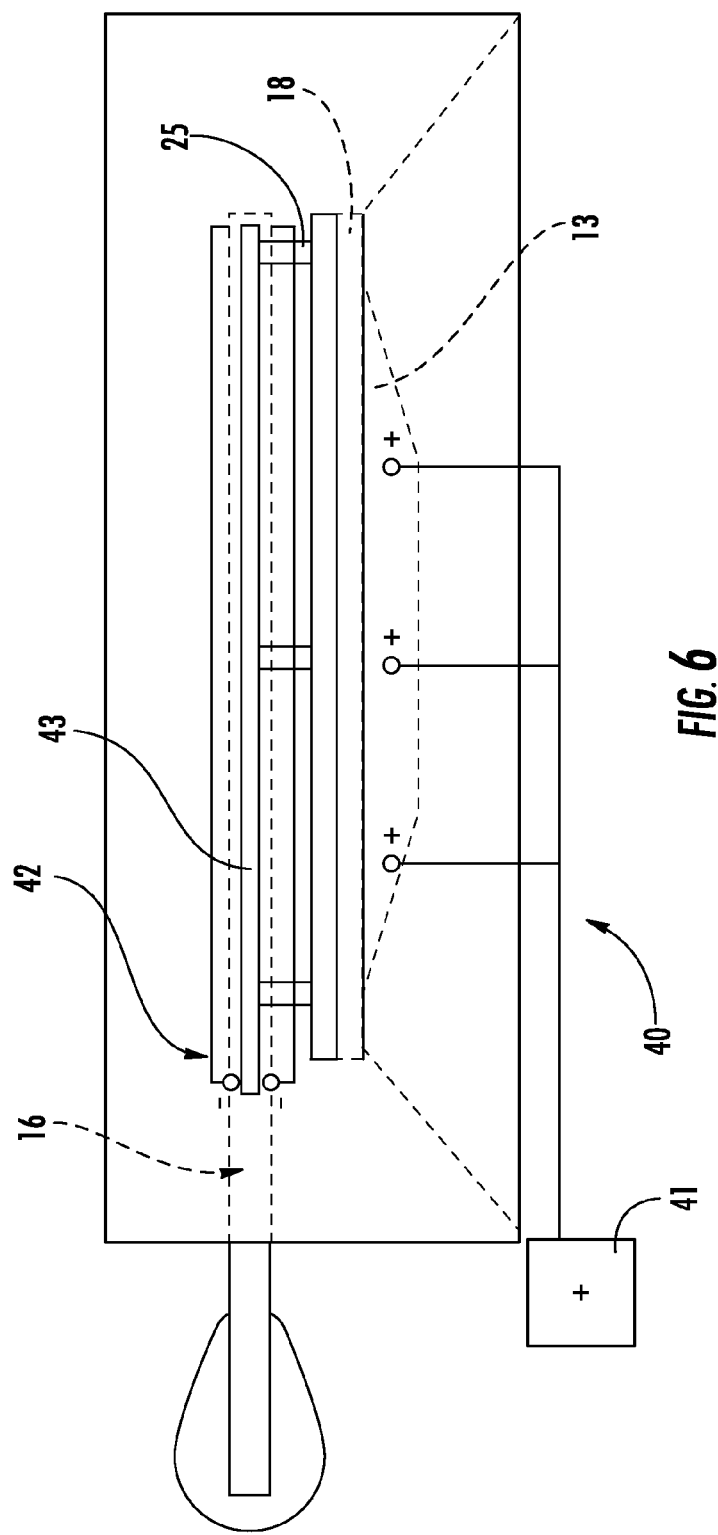
FIG. 6 shows an electric circuit of the apparatus of FIG. 1.

In use, poultry 23 are shackled to the conveyer system 17 with their heads down. The basins 12 and 13 of the trough 11 are filled with the electrolyte solution to permit electrical current to be imparted on the poultry 23. An electric circuit 40, FIG. 6, is electrically connected to the basins 12 and 13 to impress a voltage through the electrolyte solution.

The electrical circuit 40 is of a closed loop configuration. The anode or positive 41 is connected in series at three locations (beginning, middle, and end) on grating of the apparatus 10 to ensure voltage is distributed evenly to all sections of the apparatus 10. It should be appreciated that any suitable number of locations may be used to ensure voltage distribution. The cathode or ground 42 is connected to a grounding bar 43 connected to the diverter 16 and positioned for continuous contact with the shackles 29. By placing the ground bar 43 in the path of the shackles 29, the shackles 29 are forced into contact with the ground bar 43, FIG. 3, thereby creating the closed loop. The closed loop configuration reduces the resistance and lowers the amperage required to get an effective stun. Further, by separating the poultry 23 using a multi-zone trough 11, the resistance is further reduced due to fewer poultry 23 being in a basin at one time; thus, allowing the use of ever lower amperage. The benefit of lower amperage is that it greatly reduces physical damage to the poultry 23 due to less severe muscle contraction during the stun process.

As the conveyer system 17 moves the poultry 23 towards the trough 11, the conveyor system 17 engages the teeth 27 of disc 20 and causes the separator 14 to rotate. The arms 28 of disc 21 mechanically moves every other one of the poultry 23 to an opposing side of the diverter 16, thereby separating the poultry 23 into opposing basins 12 and 13 while the conveyor system 17 continues to move. By separating the poultry 23, as described, the spacing between adjacent ones of the poultry 23 is increased to allow the poultry 23 to move their wings towards their body without contacting adjacent ones of the poultry.

As a result, a significant reduction in broken bones, hemorrhaging of blood vessels, and improvement of the overall quality of the carcass of the poultry is realized. Further broken wings and bloody joints originally caused or exasperated during the stunning process is reduced or eliminated, and overall product downgrades due to damage caused by previous methods are significantly reduced.

An apparatus and method for stunning poultry with minimal damage is described above. Various details of the invention may be changed without departing from its scope. Furthermore, the foregoing description of the preferred embodiments of the invention and best mode for practicing the invention are provided for the purpose of illustration only and not for the purpose of limitation.

I claim:

1. An apparatus for stunning poultry, comprising:
    (a) a multi-zone trough having a plurality of basins, each of the plurality of basins being separated by a divider; and
    (b) a separator adapted to separate shackled poultry hung from a conveyor system into a respective one of the plurality of basins such that once separated, the divider maintains the poultry in a separated condition during a stunning process.

2. The apparatus according to claim 1, wherein the separator is driven by the conveyor system.

3. The apparatus according to claim 1, wherein the separator includes:
    (a) a drive disc having a plurality of teeth disposed about its circumference to engage the conveyor system; and
    (b) a selector disc having a plurality of spaced-apart arms adapted to engage selected shackles connected to the conveyor system such that the arms move the selected shackles outwardly to place the shackles on opposing sides of the divider.

4. The apparatus according to claim 3, wherein the drive disc and selector disc are aligned with one another and mated to a drive shaft such that driving of the drive disc by the conveyor system causes the selector disc to be driven.

5. The apparatus according to claim 1, and further including a diverter extending outwardly from the divider to aid in the separation of the shackled poultry.

6. The apparatus according to claim 1, and further including an electric circuit adapted to stun poultry residing in a respective basin.

7. The apparatus according to claim 6, wherein the electric circuit is a closed loop system.

8. The apparatus according to claim 6, wherein the electric circuit includes an anode electrically connected in series at a plurality of locations to ensure that the voltage is distributed evenly throughout a basin.

9. The apparatus according to claim 6, wherein the electric circuit includes a cathode connected to a grounding bar, the grounding bar being positioned along the diverter to provide continuous contact with shackles being conveyed by the conveyor.

10. The apparatus according to claim 1, and further including a closed loop electric circuit for stunning poultry positioned in a respective one of the basins, the electric circuit including:
    (a) an anode connected in series at a plurality of locations along the apparatus to provide voltage distribution across the apparatus;
    (b) a cathode connected to a grounding bar positioned for continuous contact with shackles being conveyed through the apparatus by a conveyor; and
    (c) wherein when the shackles make contact with the grounding bar, the electric circuit is closed to permit current to flow through the electrical circuit, thereby stunning the poultry positioned in a respective basin.

11. A method of stunning poultry, comprising the steps of:
    (a) providing an apparatus having:
        (i) a multi-zone trough; and
        (ii) a separator;
    (b) shackling poultry to shackles connected to a conveyor system;
    (c) conveying the shackled poultry towards the multi-zone trough;
    (d) using the separator to separate the shackled poultry into a respective zone of the multi-zone trough;
    (e) conveying the separated shackled poultry into basins of the multi-zone trough; and
    (f) stunning the shackled poultry.

12. The method according to claim 11, further including the step of using the conveyor system to drive the separator.

13. The method according to claim 11, further including the step of using a diverter to aid in the separation of the shackled poultry.

14. The method according to claim 11, further including the step of filling the basins of the multi-zone trough with an electrolyte solution.

15. The method according to claim 14, further including the step of imparting an electric current into the electrolyte solution to stun the shackled poultry.

16. A method of stunning poultry, comprising the steps of:
   (a) providing an apparatus having:
      (i) a multi-zone trough; and
      (ii) a separator;
   (b) shackling poultry to shackles connected to a conveyor system;
   (c) conveying the shackled poultry towards the multi-zone trough;
   (d) using the separator to move every other shackled poultry outwardly such that the moved poultry is divided from unmoved poultry by a divider of the multi-zone trough;
   (e) conveying the separated shackled poultry into basins of the multi-zone trough; and
   (f) stunning the shackled poultry.

17. The method according to claim 16, further including the step of using a closed loop electric circuit to impart an electric current into an electrolyte solution contained in basins of the multi-zone trough.

18. The method according to claim 17, wherein the closed loop electric circuit includes:
   (a) an anode connected in series at a plurality of locations along the basins to provide even voltage distribution across the basins and into the electrolyte solution; and
   (b) a cathode connected to a grounding bar positioned for continuous contact with shackles being conveyed through the apparatus by the conveyor system such that when the shackles make contact with the grounding bar, the electric circuit is closed to permit current to flow.

* * * * *